(12) United States Patent
Schramm

(10) Patent No.: US 11,565,747 B1
(45) Date of Patent: Jan. 31, 2023

(54) ROLLOVER PREVENTION APPARATUS

(71) Applicant: Michael R. Schramm, Perry, UT (US)

(72) Inventor: Michael R. Schramm, Perry, UT (US)

(*) Notice: Subject to any disclaimer, the term of this patent is extended or adjusted under 35 U.S.C. 154(b) by 7 days.

(21) Appl. No.: 17/391,001

(22) Filed: Aug. 1, 2021

Related U.S. Application Data

(63) Continuation of application No. 16/384,506, filed on Apr. 15, 2019, now Pat. No. 11,077,877, which is a continuation of application No. 15/442,573, filed on Feb. 24, 2017, now Pat. No. 10,259,494, which is a continuation of application No. 14/733,042, filed on Jun. 8, 2015, now Pat. No. 9,580,103, which is a continuation of application No. 14/145,950, filed on Jan. 1, 2014, now Pat. No. 9,050,997, which is a continuation-in-part of application No. 13/222,157, filed on Aug. 31, 2011, now Pat. No. 8,634,989.

(60) Provisional application No. 61/378,482, filed on Aug. 31, 2010, provisional application No. 61/385,535, filed on Sep. 22, 2010.

(51) Int. Cl.
| | |
|---|---|
| *B62D 5/00* | (2006.01) |
| *B62D 6/00* | (2006.01) |
| *B62D 15/02* | (2006.01) |
| *B62D 1/16* | (2006.01) |

(52) U.S. Cl.
CPC .............. *B62D 6/002* (2013.01); *B62D 1/16* (2013.01); *B62D 5/005* (2013.01); *B62D 6/008* (2013.01); *B62D 15/025* (2013.01); *B62D 15/0215* (2013.01)

(58) Field of Classification Search
None
See application file for complete search history.

(56) References Cited

U.S. PATENT DOCUMENTS

| | | | |
|---|---|---|---|
| RE24,122 E | 2/1956 | Randol | |
| 3,805,932 A | 4/1974 | Ernst et al. | 192/45 |
| 5,022,480 A | 6/1991 | Inagaki et al. | 180/79.1 |
| 5,189,621 A | 2/1993 | Onari et al. | 364/431.04 |
| 5,489,006 A | 2/1996 | Saiia et al. | 180/143 |
| 5,547,055 A | 8/1996 | Chang et al. | 192/45 |
| 5,695,021 A | 12/1997 | Schaffner et al. | 180/208 |
| 5,957,983 A | 9/1999 | Tominaga | 701/23 |
| 6,053,270 A | 4/2000 | Nishikawa et al. | 180/168 |
| 6,170,594 B1 | 1/2001 | Gilbert | 180/282 |

(Continued)

FOREIGN PATENT DOCUMENTS

| | | | |
|---|---|---|---|
| CA | 2304545 | 10/2001 | B60R 21/13 |
| CN | 202358164 U | 8/2012 | |

(Continued)

OTHER PUBLICATIONS

Gustafsson, Automotive safety systems, 2009, IEEE, p. 1-16 (Year: 2009).*

(Continued)

*Primary Examiner* — McDieunel Marc
(74) *Attorney, Agent, or Firm* — Michael R. Schramm

(57) ABSTRACT

The rollover prevention apparatus defines an adaptive steering range limiting device comprising a control unit and a pair of opposing unidirectional brake assemblies mounted to a steering column position detection disc. The rollover prevention apparatus prevents the steering wheel of the vehicle from being turned beyond the threshold of vehicle rollover, but otherwise does not restrict the rotational range of motion of the steering wheel of a vehicle.

20 Claims, 10 Drawing Sheets

(56) References Cited

U.S. PATENT DOCUMENTS

| | | | |
|---|---|---|---|
| 6,304,805 B1 | 10/2001 | Onogi | 701/36 |
| 6,349,247 B1 | 2/2002 | Schramm et al. | 701/1 |
| 6,540,043 B2 | 4/2003 | Will | 180/404 |
| 6,584,388 B2 | 6/2003 | Schubert et al. | 701/46 |
| 6,588,799 B1 | 7/2003 | Sanchez | 280/755 |
| 6,714,848 B2 | 3/2004 | Schubert et al. | 701/46 |
| 6,741,922 B2 | 5/2004 | Holler | 701/71 |
| 6,819,980 B2 | 11/2004 | Bauer et al. | 701/1 |
| 6,938,924 B2 | 9/2005 | Feldman et al. | 280/755 |
| 6,954,140 B2 | 10/2005 | Holler | 340/438 |
| 7,031,816 B2 | 4/2006 | Lehmann et al. | 701/48 |
| 7,057,503 B2 | 6/2006 | Watson | 340/440 |
| 7,065,442 B2 | 6/2006 | Sakata | 701/72 |
| 7,077,215 B2 | 7/2006 | Berkeley | 172/684.5 |
| 7,107,136 B2 | 9/2006 | Barta et al. | 701/70 |
| 7,132,937 B2 | 11/2006 | Lu et al. | 340/440 |
| 7,237,629 B1 | 7/2007 | Bland et al. | 180/6.24 |
| 7,261,303 B2 | 8/2007 | Stefan et al. | 280/5.5 |
| 7,325,644 B2 | 2/2008 | Sakai | 180/402 |
| 7,369,927 B2 | 5/2008 | Hille et al. | 701/38 |
| 7,440,844 B2 | 10/2008 | Barta et al. | 701/124 |
| 7,493,204 B2 | 2/2009 | Yano | 701/70 |
| 7,580,785 B2 | 8/2009 | Matsumoto et al. | 701/70 |
| 7,613,555 B2 | 11/2009 | Takeda | 701/38 |
| 7,630,816 B2 | 12/2009 | Yasutake et al. | 701/72 |
| 7,756,621 B2 | 7/2010 | Pillar et al. | 701/41 |
| 7,894,955 B2 | 2/2011 | Milot | 701/38 |
| 7,957,866 B2 | 6/2011 | Oba et al. | 701/41 |
| 8,014,922 B2 | 9/2011 | Le et al. | 701/45 |
| 8,050,823 B2 | 11/2011 | Lee et al. | 701/42 |
| 8,083,557 B2 | 12/2011 | Sullivan | 440/6 |
| 8,315,765 B2 | 11/2012 | Gerdes et al. | 701/41 |
| 8,489,287 B2 | 7/2013 | Hsu et al. | 701/45 |
| 8,634,989 B1 | 1/2014 | Schramm | 701/41 |
| 8,641,064 B2 | 2/2014 | Krajekian | 280/124.103 |
| 8,718,897 B2 * | 5/2014 | Wright | B60L 15/32 701/91 |
| 8,798,869 B2 | 8/2014 | Ohnuma et al. | 701/48 |
| 8,874,320 B2 * | 10/2014 | Barthomeuf | B62D 6/003 701/42 |
| 8,899,601 B1 | 12/2014 | Mothfar | 280/124.106 |
| 8,924,116 B2 | 12/2014 | Yamada et al. | B60T 8/17554 |
| 9,050,997 B1 | 6/2015 | Schramm | B62D 6/00 |
| 9,283,825 B2 | 3/2016 | Mousa | B60G 17/01933 |
| 9,469,214 B2 * | 10/2016 | Wright | B60W 30/18172 |
| 9,580,103 B2 | 2/2017 | Schramm | B62D 6/002 |
| 2002/0195293 A1 | 12/2002 | Will | 180/445 |
| 2003/0050741 A1 | 3/2003 | Bauer | 701/1 |
| 2003/0055549 A1 | 3/2003 | Barta et al. | 701/70 |
| 2003/0088349 A1 | 5/2003 | Schubert et al. | 701/36 |
| 2003/0093200 A1 | 5/2003 | Schubert et al. | 701/46 |
| 2003/0182041 A1 | 9/2003 | Watson | 701/45 |
| 2003/0225499 A1 | 12/2003 | Holler | 701/71 |
| 2004/0041358 A1 | 3/2004 | Hrovat et al. | 280/5.502 |
| 2004/0064246 A1 | 4/2004 | Lu et al. | 701/124 |
| 2004/0102894 A1 | 5/2004 | Holler | 701/124 |
| 2004/0104066 A1 | 6/2004 | Sakai | 180/402 |
| 2004/0215384 A1 | 10/2004 | Kummel et al. | 701/48 |
| 2005/0012392 A1 | 1/2005 | Kato et al. | 303/191 |
| 2005/0060069 A1 | 3/2005 | Breed et al. | 701/29 |
| 2005/0082107 A1 | 4/2005 | Husain et al. | 180/402 |
| 2005/0087389 A1 | 4/2005 | Turner et al. | 180/446 |
| 2005/0110227 A1 | 5/2005 | Stefan et al. | 280/5.501 |
| 2005/0131604 A1 | 6/2005 | Lu | 701/38 |
| 2005/0216154 A1 | 9/2005 | Lehmann et al. | 701/38 |
| 2005/0216155 A1 | 9/2005 | Kato et al. | 701/41 |
| 2005/0222727 A1 | 10/2005 | Hille et al. | 701/38 |
| 2005/0252667 A1 | 11/2005 | Berkeley | 172/278 |
| 2006/0030991 A1 | 2/2006 | Barta et al. | 701/70 |
| 2006/0064218 A1 | 3/2006 | Subbian et al. | 701/45 |
| 2006/0074530 A1 | 4/2006 | Meyers et al. | 701/1 |
| 2006/0074534 A1 | 4/2006 | Geborek et al. | 701/38 |
| 2006/0129291 A1 | 6/2006 | Lu et al. | 701/36 |
| 2006/0129298 A1 | 6/2006 | Takeda | 701/70 |
| 2006/0162987 A1 | 7/2006 | Hagl | 180/411 |
| 2006/0217860 A1 | 9/2006 | Ihara | 701/41 |
| 2006/0265108 A1 | 11/2006 | Kieren et al. | 701/1 |
| 2007/0112498 A1 | 5/2007 | Yasutake et al. | 701/72 |
| 2007/0299583 A1 | 12/2007 | Fujita et al. | 701/41 |
| 2008/0082246 A1 | 4/2008 | Bolt et al. | 701/29 |
| 2008/0086248 A1 | 4/2008 | Lu et al. | 701/41 |
| 2008/0086251 A1 | 4/2008 | Lu et al. | 701/70 |
| 2008/0097666 A1 | 4/2008 | Oba et al. | 701/41 |
| 2008/0109133 A1 | 5/2008 | Bedner et al. | 701/41 |
| 2008/0114509 A1 | 5/2008 | Inoue et al. | 701/38 |
| 2008/0114513 A1 | 5/2008 | Pillar et al. | 701/41 |
| 2008/0133101 A1 | 6/2008 | Woywod et al. | 701/83 |
| 2008/0262686 A1 | 10/2008 | Kieren et al. | 701/70 |
| 2008/0281487 A1 | 11/2008 | Milot | 701/38 |
| 2009/0082923 A1 | 3/2009 | Gerdes et al. | 701/41 |
| 2009/0084616 A1 | 4/2009 | Kezobo et al. | 180/6.44 |
| 2009/0157262 A1 | 6/2009 | Lee et al. | 701/42 |
| 2009/0216409 A1 | 8/2009 | Lich et al. | 701/46 |
| 2009/0228173 A1 | 9/2009 | Bolio et al. | 701/41 |
| 2010/0191423 A1 | 7/2010 | Koyama et al. | 701/42 |
| 2010/0234175 A1 | 9/2010 | Hofler et al. | 477/35 |
| 2011/0010048 A1 * | 1/2011 | Messih | B60W 40/13 701/1 |
| 2011/0060505 A1 | 3/2011 | Suzuki et al. | 701/42 |
| 2012/0059550 A1 | 3/2012 | Maeda et al. | 701/42 |
| 2012/0173083 A1 | 7/2012 | Hsu et al. | 701/45 |
| 2012/0185136 A1 | 7/2012 | Ohnuma et al. | 701/48 |
| 2012/0283923 A1 | 11/2012 | Yamada et al. | 701/70 |
| 2014/0207320 A1 * | 7/2014 | Wright | B60L 15/2054 701/22 |
| 2015/0034407 A1 | 2/2015 | Guerster | B62D 5/008 |
| 2015/0142266 A1 | 5/2015 | Schramm | B62D 6/00 |
| 2015/0239409 A1 | 8/2015 | Mousa | B60R 16/0233 |
| 2015/0266503 A1 | 9/2015 | Schramm | B62D 6/002 |
| 2015/0353150 A1 | 12/2015 | Ursich et al. | B62D 37/04 |
| 2017/0166250 A1 | 6/2017 | Schramm | B62D 6/002 |
| 2021/0197820 A1 | 7/2021 | Keller | B60W 30/18145 |

FOREIGN PATENT DOCUMENTS

| | | | | |
|---|---|---|---|---|
| DE | 102007029958 | | 1/2009 | B62D 6/008 |
| EP | 1046571 | | 10/2000 | B62D 6/00 |
| EP | 1593583 | | 11/2005 | B62D 5/06 |
| EP | 1914140 | | 4/2008 | B62D 6/00 |
| EP | 1920994 | | 5/2008 | B62D 6/00 |
| JP | H06206553 | | 7/1994 | B62D 5/04 |
| JP | H08207820 | | 8/1996 | B62D 6/00 |
| JP | 2007038928 | | 8/2005 | B60W 30/04 |
| JP | 2008273318 | | 11/2008 | B62D 6/00 |
| KR | 1019960018630 | | 12/1997 | B62D 6/00 |
| KR | 20080113740 | | 6/2007 | B62D 6/00 |
| KR | 20090000897 | | 8/2009 | B50W 30/04 |
| RU | 2440259 | | 1/2012 | |
| WO | WO2006129862 | | 8/2006 | B60W 30/04 |
| WO | WO2011143377 | | 11/2011 | B60G 17/016 |

OTHER PUBLICATIONS

Dominguez-Garcia, et al. A backup system for automotive steer-by-wire, actuated by selective braking, 2004, IEEE, p. 383-388 (Year: 2004).*

Jonnas et al., Stabilization of Automotive Vehicles Using Active Steering and Adaptive Brake Control Allocation, 2009, IEEE, 345-558 (Year: 2009).*

Odenthal et al. Nonlinear steering and braking control for vehicle rollover avoidance, 1999, IEEE, 598-603 (Year: 1999).*

AB Dynamics, Autonomous Vehicle Testing by AB Dynamics, YouTube Website, Dec. 15, 2007, p. 1.

AB Dynamics, Autonomous Vehicle Track Testing Systems, AB Dynamics Website, Date unknown, p. 1.

Ackermann et al., Robust Steering Control for Active Rollover Avoidance of Vehicles with Elevated Center of Gravity, DLR, Jul. 1998, p. 1-6.

Aso et al., Lateral State Prediction for Automated Steering using Reliability-Weighted Measurements from Multiple Sensors, IEEE ITSC, Sep. 30, 2007, pp. 2-7.

(56) References Cited

OTHER PUBLICATIONS

Binda et al., Intelligent Prediction and Prevention of Vehicle Rollover Using NNLQG Regulator, Jan. 2015, IJEETC, p. 40-46.
Carlson et al., Optimal Rollover Prevention with Steer by Wire and Differential Braking, Nov. 16, 2003, ASME, p. 1-10.
Chen et al., Differential Braking Rollover Prevention, Nov. 2001, VSD, p. 359-389.
Chen et al., Predictive Rollover Index, 2013, IEEE, p. 4123-4133.
Chen et al., Vehicle Rollover Avoidance, 2010, IEEE, p. 70-85.
Eisele et al., VDC Rollover Prevention Articulated Heavy Trucks, Aug. 22, 2000, AVEC, p. 1-8.
Falcone et al., Predictive Active Steering Control for Autonomous Vehicles, IEEE, Jan. 2007, pp. 1-14.
Jian et al., Real-Time Roll State Estimation, 2009, IEEE, p. 4387-4392.
Kabir et al., Automated Planning, 2017, IEEE, vol. 14, No. 3, p. 1364-1377.
Kidane et al., Development and Experimental Evaluation of a Tilt Stability Control System for Narrow Commuter Vehicles, IEEE, Nov. 2010, p. 1266-1279.
Miller et al., Team Cornell's Skynet: Robust Perception and Planning in an Urban Environment, JOFR, Jun. 16, 2008, pp. 493-527.
Odenthal et al., Nonlinear Steering and Braking Control for Vehicle Rollover Avoidance, DLR, Aug. 31, 1999, p. 1-6.
Onieva et al., Autonomous car fuzzy control modeled by iterative genetic algorithms, 2009, IEEE, p. 1615-1620.
Rajamani et al., New paradigms for the integration of yaw stability and rollover prevention functions in vehicle stability control, 2013, IEEE, p. 249-261.
Richier et al., Rollover Prevention of ATV, 2013, IEEE, p. 1-6.
Rieth et al., ESC II—ESC with Active Steering Intervention, SAE, Mar. 8, 2004, pp. 1-7.
Schofield, Vehicle Dynamics Control for Rollover Prevention, Dec. 2006, LU, p. 1-109.
Solmaz et al., A methodology for the design of robust rollover prevention controllers for automotive vehicle: Part 1—Differential braking, 2007, IEEE, pg. unknown.
Solmaz et al., A methodology for the design of robust rollover prevention controllers for automotive vehicle: Part 2—Active steering, 2007, IEEE, p. 1606-1611.
Stankiewicz et al., Open-Loop Vehicle Collision Avoidance, 2014, IEEE, p. 3207-3212.
Tachibana et al., Toyota Automated Highway Vehicle System, Toyota Technical Review, vol. 43, No. 1, Sep. 1993, pp. 19-24.
Tachibana et al., Automated Vehicle System Aligned with Infrastructure, Toyota Technical Review, vol. 45, No. 1, Sep. 1996, pp. 44-50.
Tianjun et al., Rollover Prevention for Heavy Trucks, IEEE, 2009, p. 182-185.
Yakub et al., Heavy Vehicle Stability and Rollover Prevention, IEEE, 2015, p. 16.
Yim et al., Active Suspension and ESP for Rollover Prevention, Apr. 1, 2010, KAIST, p. 1-6.
Yoon et al., Rollover Mitigation Control Scheme, 2006, IEEE.
Yoon et al., Unified Chassis Control for Rollover Prevention and Lateral Stability, IEEE, Feb. 2009, vol. 58 No. 2.

\* cited by examiner

ROLLOVER PREVENTION APPARATUS

CROSS REFERENCE TO RELATED APPLICATIONS

This nonprovisional utility patent application is a continuation of and claims the benefit under 35 USC § 120 to U.S. application Ser. No. 16/384,506 filed Apr. 15, 2019 and expected to issue as U.S. Pat. No. 11,077,877 on Aug. 3, 2021, which is a continuation of and claims the benefit under 35 USC § 120 to U.S. application Ser. No. 15/442,573 filed Feb. 24, 2017 and since issued as U.S. Pat. No. 10,259,494 on Apr. 16, 2019, which is a continuation of and claims the benefit under 35 USC § 120 to U.S. application Ser. No. 14/733,042 filed Jun. 8, 2015 and since issued as U.S. Pat. No. 9,580,103 on Feb. 28, 2017, which is a continuation of and claims the benefit under 35 USC § 120 to U.S. application Ser. No. 14/145,950 filed Jan. 1, 2014 and since issued as U.S. Pat. No. 9,050,997 on Jun. 9, 2015, which is a continuation-in-part of and claims the benefit under 35 USC § 120 to co-pending U.S. application Ser. No. 13/222,157 filed Aug. 31, 2011 and since issued as U.S. Pat. No. 8,634,989 on Jan. 21, 2014, which claims the benefit under 35 USC § 119(e) of U.S. provisional application No. 61/378,482 filed Aug. 31, 2010 and of U.S. provisional application No. 61/385,535 filed Sep. 22, 2010, all of which are expressly incorporated herein in their entirety by this reference.

FIELD OF THE INVENTION

The present invention relates to steering control devices and more especially devices for use in preventing steering to the point of vehicle rollover.

BACKGROUND OF THE INVENTION

Vehicle rollover—generally defined as vehicular accident in which a vehicle turns over on its side or roof—is an extremely dangerous form of a vehicle crash. Vehicle rollover accidents while relatively rare—estimated at approximately 3% of all vehicle crashes—account for a disproportionately high number of fatal crashes—estimated at approximately 31% of all fatal vehicle crashes. The Nation Highway Transportation Safety Administration (NHTSA) reported that 10,666 people were killed in the US in vehicle rollover crashes in 2002. Many factors are involved in a vehicle rollover including for instance vehicle center of gravity, vehicle suspension stiffness, vehicle tire traction, etc. However, according to Wikipedia, "The main cause for rolling over is turning too sharply while moving too fast" (see Appendix A, page 1, first paragraph). While there may be several factors for a vehicle to be turned or steered beyond the vehicle threshold of roll such as driver hurry or impatience and driver inexperience, a well know cause for excessive turning or steering to the point of vehicle roll is the occurrence of an object such as a tumble weed or squirrel suddenly appearing in the drivers path (hereafter referred to Sudden Object Appearance or SOA). In such SOA, even the most experienced drivers can feel the inherent and immediate urge to rapidly turn the steering wheel. It is just such turning of the steering wheel that causes many vehicle rollovers.

In recent years, a system commonly referred to as Electronic Stability Control or ESC has, by automatically selectively apply torque or braking force to certain of a vehicles wheels, been used in significantly improving stability of vehicles, especially when such vehicles would have otherwise "spun out" or "fish-tailed" when cornering. However, such ESC systems, which typically require complex rollover prediction schemes, cannot prevent vehicle rollover when a vehicle steering wheel is turned too sharply for the vehicle speed as in a SOA situation. Further, a number of inventions dealing with vehicle steering control have been developed over the years. However, such inventions have typically merely dealt with preventing damage to a driving surface (i.e. turf) or prevention of a power steering system, and no such systems are known to prevent vehicle rollover, especially in a SOA situation. Examples of such inventions are provided in the following list of US patents and applications, the whole of which are incorporated herein by reference: U.S. Pat. Nos. 5,489,006, 6,584,388, 6,588,799, 6,714,848, 6,954,140, 7,107,136, 7,261,303, 7,325,644, 7,440,844, 7,613,555, 20030055549, 20030088349, 20030093201, 20040102894, 20040104066, 20040215384, 20050060069, 20050110227, 20060030991, 20060129298, 20060162987, 20070299583, 20080133101, 20090228173, 20100191423, and 20110060505.

SUMMARY OF THE INVENTION

The present invention is a vehicle rollover prevention apparatus. Thus unless indicated otherwise, where used in this application, the term "Anti-Roll Steering" or "ARS" shall be understood to mean a system or apparatus that adaptively adjusts the steering range of motion of a vehicle such as to prevent rollover of the vehicle. Thus for instance, ARS allows a vehicle steering to be steered in a full unrestricted range of motion when the vehicle is moving substantially below a predetermined speed (such as the speed that correlates to a roll threshold of the vehicle at a given turn angle or turn rate of the vehicle), but prevents a vehicle steering from being steered in a full unrestricted range of motion when the vehicle is moving at or near the predetermined speed. In a first embodiment, the apparatus defines an adaptive steering range limiting device (ASRLD) comprising a control unit and a pair of opposing unidirectional brake assemblies mounted to a steering column position detection disc (SCPDD). The unidirectional brake assemblies comprise a first left hand unidirectional brake assembly (LHUBA) and a second right hand unidirectional brake assembly (RHUBA), with the LHUBA operable to brake in a left hand or counterclockwise (CCW) direction and yet roll substantially freely in a right hand or clockwise (CW) direction, and with the RHUBA operable to brake in a right hand or clockwise (CW) direction and yet roll substantially freely in a left hand or counterclockwise (CCW) direction. The SCPDD includes at least one and preferably a plurality of sensors that sense the angular position of a vehicle steering wheel and provide such angular position information to the control unit. The control unit also receives speed data from a vehicle speed sensor. In practice, when a vehicle in which the ASRLD is installed is moving at less than a predetermined rate of speed, the unidirectional brake assemblies are not applied, and the vehicle steering wheel may be turned to the full hand range of steering motion. However, when a vehicle in which the ASRLD is installed is moving at no less than a predetermined rate of speed and the vehicle steering wheel is turned to no less than a predetermined left hand angle, the LHUBA is automatically applied, and the vehicle steering left hand range of motion is restricted such that the steering wheel may not be turned beyond the threshold of left hand rollover for the particular vehicle for the given vehicle speed. When the vehicle speed and/or steering wheel left hand angle is reduced, the LHUBA is automatically released. Further, when a vehicle in which the ASRLD is installed is moving at no less than a predetermined rate of speed and the vehicle steering wheel is turned to no less than a predetermined right hand angle, the RHUBA is automatically applied, and the vehicle steering right hand range of motion is restricted such that the steering wheel may not be turned beyond the threshold of right hand rollover for the particular vehicle for the given vehicle speed. When the vehicle speed and/or steering wheel right hand angle is reduced, the RHUBA is automatically released. It is noted that when the unidirectional brake assemblies are (separately) applied, although the steering wheel is prevented from being turn beyond a predetermined left hand or right hand angle, the steering wheel is free to be turned back toward a steering wheel centered or neutral position. In this method, a vehicle is prevented from being steered beyond the threshold of vehicle role and yet the vehicle steering wheel remains otherwise usable over the unrestrained rotational range of travel.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
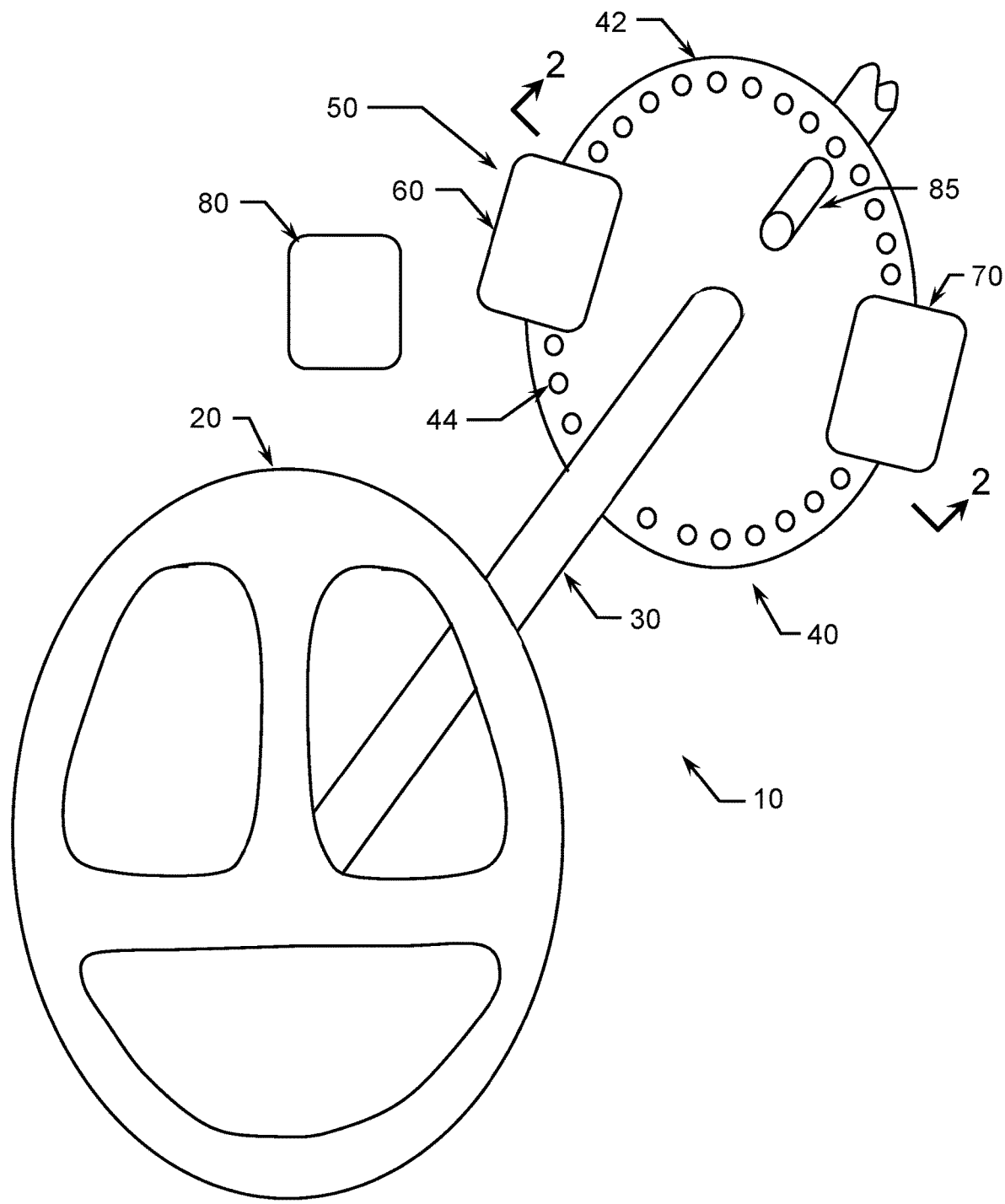
FIG. 1 is a trimetric view of a first embodiment of the invention.
Figure 2:
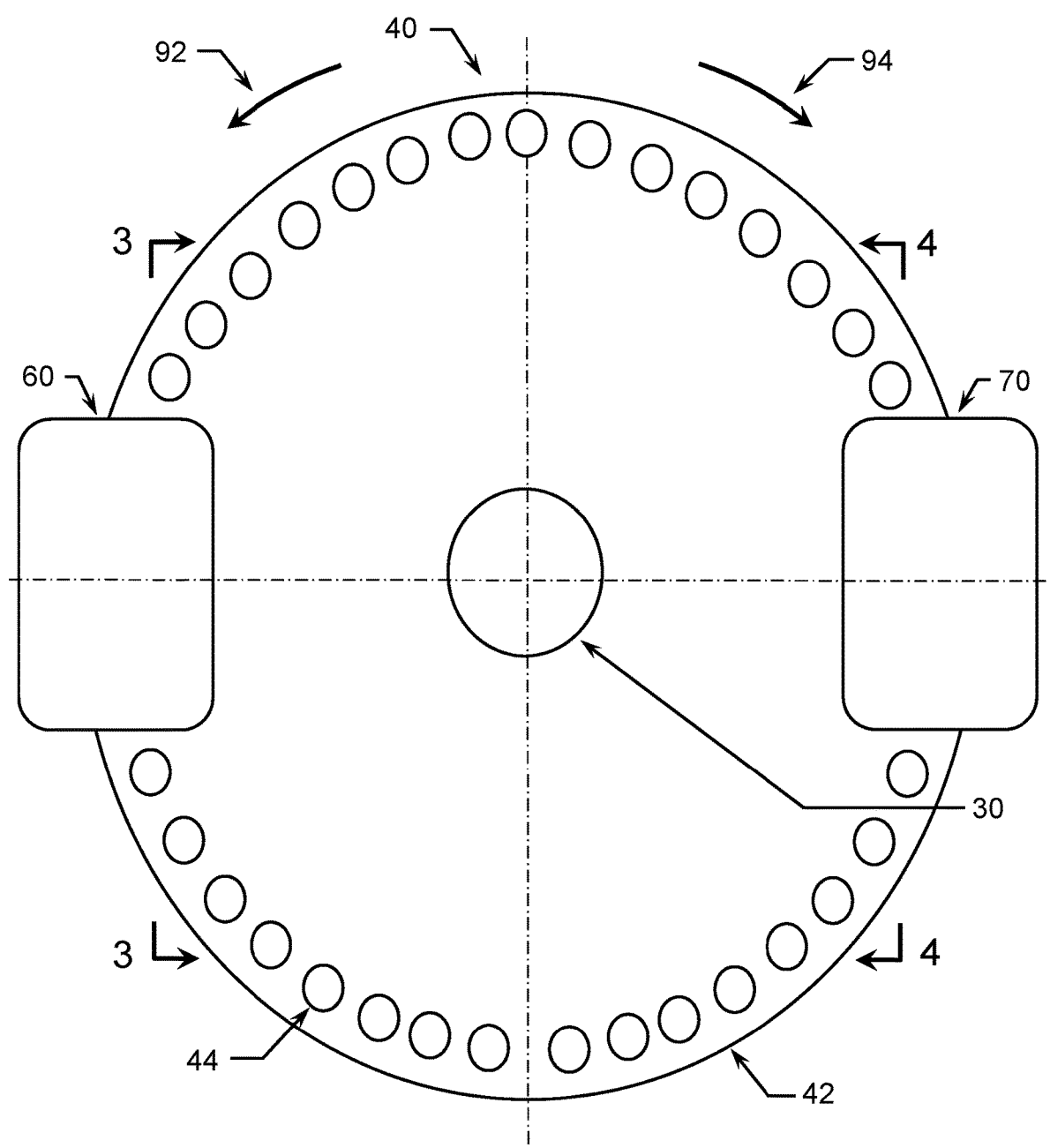
FIG. 2 is an orthographic cross-sectional view of the first embodiment of the invention taken substantially at the location indicated by the cross-section arrows annotated with "2" in FIG. 1.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

| FEATURE TABLE | |
|---|---|
| # | Feature |
| 10 | adaptive steering range limiting device |
| 20 | steering wheel |
| 30 | steering column |
| 40 | steering column position detection disc |
| 42 | disc |
| 44 | magnetic target |
| 50 | unidirectional brake assemblies |
| 60 | left hand unidirectional brake assembly |
| 62 | caliper housing |
| 64 | unidirectional roller |
| 70 | right hand unidirectional brake assembly |
| 72 | caliper housing |
| 74 | unidirectional roller |
| 80 | electronic control unit |

-continued

FEATURE TABLE

| # | Feature |
|---|---|
| 85 | sensor |
| 92 | left hand or CCW direction indication arrow |
| 94 | right hand or CW direction indication arrow |
| 110 | adaptive steering range limiting device |
| 120 | steering wheel |
| 130 | steering column |
| 140 | steering column disc device |
| 142 | disc |
| 144 | actuator pin |
| 144a | actuator pin-extended |
| 180 | electronic control unit |
| 185 | block |
| 192 | left hand or CCW direction indication arrow |
| 194 | right hand or CW direction indication arrow |

Referring now to FIGS. 1 through 4 of the drawings, a first embodiment of the invention is an adaptive steering range limiting device (ASRLD) 10 comprising a steering wheel 20, a steering column 30, a steering column position detection disc (SCPDD) 40, a pair of opposing unidirectional brake assemblies 50, an electronic control unit 80 and a sensor 85. Furthermore arrow 92 defines a left hand or counterclockwise (CCW) direction indication arrow and arrow 94 defines a right hand or clockwise (CW) direction indication arrow. Steering wheel 20 defines a conventional steering wheel as may commonly be found in a commercially available passenger vehicle. Steering column 30 defines a conventional steering column that serves to transmit steering torque from steering wheel 20 to a rack and pinion or other such vehicle wheel control device. SCPDD 40 defines a substantially thin preferably aluminum cylinder shaped disc 42 having a plurality of magnetic targets 44 embedded within disc 42 and spaced substantially equally about the periphery of disc 42. Unidirectional brake assemblies 50 define an assembly comprising a left hand unidirectional brake assembly (LHUBA) 60 and a right hand unidirectional brake assembly (RHUBA) 70. LHUBA 60 defines a brake assembly having a caliper housing 62, and a plurality of actuatable or extendable and retractable unidirectional rollers 64. Unidirectional roller 64 preferably comprises a generally hard rubber roller mounted on at least one unidirectional bearing. Unidirectional bearings are well known in the art and are for instance taught in U.S. Pat. Nos. 3,805,932 and 5,547,055, which are incorporated herein by reference. RHUBA 70 defines a brake assembly having a caliper housing 72, and a plurality of actuatable or extendable and retractable unidirectional rollers 74. Unidirectional roller 74 preferably comprises a generally hard rubber roller mounted on at least one unidirectional bearing. Electronic control unit 80 defines an electronic control unit such as are commonly in use in automobiles, and is adapted to electronically receive speed, position and other sensor input and is adapted to electronically transmit actuation signals based on predetermined inputs. Sensor 85 preferably defines an electronic sensor such as reed switch type sensor that is operable to detect near proximity to magnetic targets 44, and thus is operable to detect rotational positioning of SCPDD 40.

ASRLD 10 is assembled such that steering column 30 is connected to steering wheel 20 on a first end of steering column 30 and to SCPDD 40 on a second end of steering column 30. Unidirectional brake assemblies 50 are positioned near SCPDD 40 such that disc 42 may rotatingly pass between rollers 64 and between rollers 74. Electronic control unit 80 is electronically connected to unidirectional brake assemblies 50 and electronically connected to sensor 85. ASRLD 10 is mounted in a vehicle such that second end of steering column 30 is steeringly connected to a rack and pinion or like steering mechanism of the vehicle such that ASRLD 10 is operable to steer the vehicle. Unidirectional brake assemblies 50 are further connected to a structural member of the vehicle such that unidirectional brake assemblies 50 remain stationary relative to a rotation movement of SCPDD 40 and such that unidirectional brake assemblies 50 are able to react or withstand a steering stopping load. Electronic control unit 80 is further connected to a structural member of the vehicle such that electronic control unit 80 remains stationary regardless of rotation movement of SCPDD 40. Sensor 85 is further connected to a structural member of the vehicle such that sensor 85 remains stationary relative to a rotation movement of SCPDD 40 and such that sensor 85 is able to detect magnetic targets 44 as magnetic targets 44 move into a near proximity position to sensor 85.

Figure 3A:
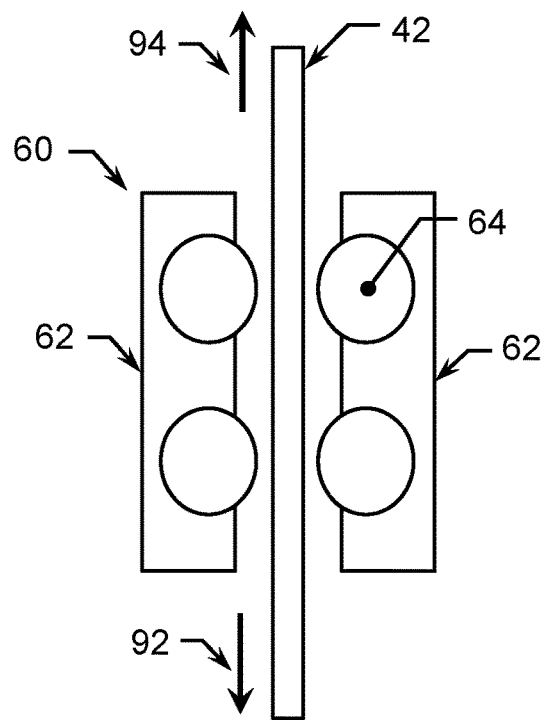
FIG. 3A is an orthographic cross-sectional view of the first embodiment of the invention taken substantially at the location indicated by the cross-section arrows annotated with "3" in FIG. 2, the invention is shown with the LHUBA in an unactuated or open position.
Figure 4A:
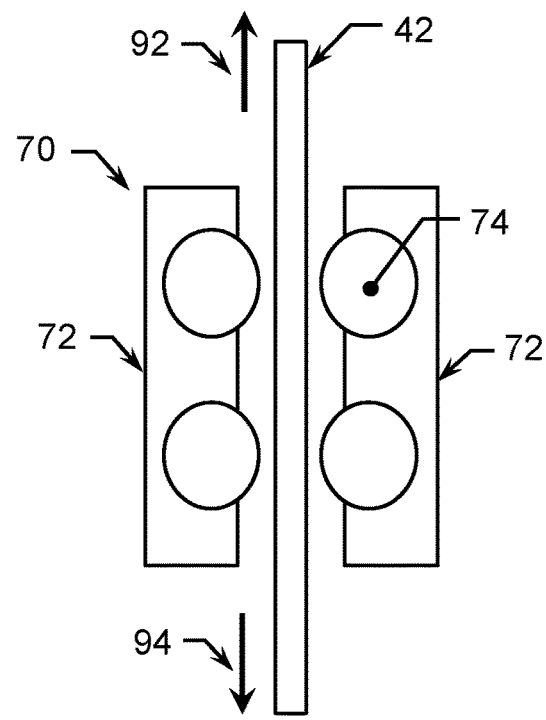
FIG. 4A is an orthographic cross-sectional view of the first embodiment of the invention taken substantially at the location indicated by the cross-section arrows annotated with "4" in FIG. 2, the invention is shown with the RHUBA in an unactuated or open position.
Figure 3B:
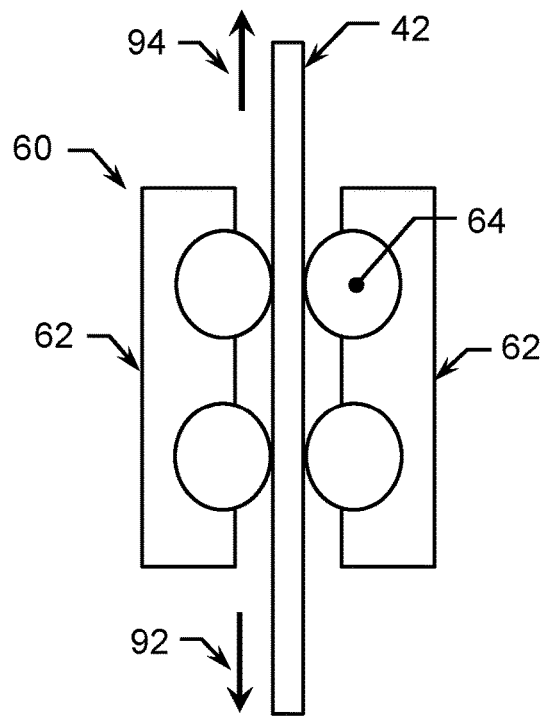
FIG. 3B is an orthographic cross-sectional view of the first embodiment of the invention taken substantially at the location indicated by the cross-section arrows annotated with "3" in FIG. 2, the invention is shown with the LHUBA in an actuated or closed position.
Figure 4B:
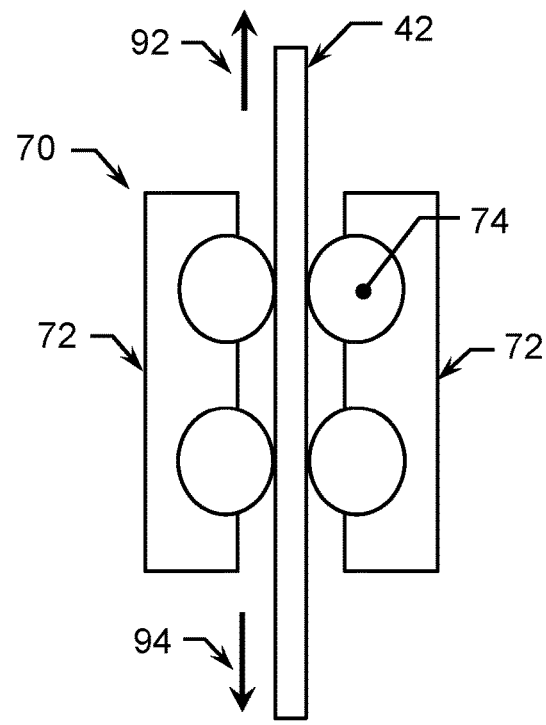
FIG. 4B is an orthographic cross-sectional view of the first embodiment of the invention taken substantially at the location indicated by the cross-section arrows annotated with "4" in FIG. 2, the invention is shown with the RHUBA in an actuated or closed position.

In practice, with ASRLD 10 operably mounted in a vehicle, when the vehicle is moving below a predetermined speed, for instance less than 10 miles per hour (mph), unidirectional brake assemblies 50 are not actuated as shown in FIGS. 3A and 4A, and steering wheel 20 may be freely rotated through its the full rotational range of motion. It is noted that when steering wheel 20 is rotated, SCPDD 40 correspondingly rotates between rollers 64 and between rollers 74 and sensor 85 and electronic control unit 80 monitors the rotational orientation of SCPDD 40. However, when the vehicle is moving at or above a predetermined speed, for instance 10 miles per hour (mph), and SCPDD 40 is sensed at being at or above a left hand rotational orientation of greater than a predetermined amount, for instance 10 degrees CCW from a center or neutral steering position, electronic control unit 80 determines a steering prevention threshold has been achieved and sends an actuation signal to LHUBA 60, and LHUBA 60 actuates by moving unidirectional rollers 64 into unidirectional braking contact with SCPDD 40 as shown in FIG. 3B and steering wheel 20 is prevented from rotating further in a left hand or CCW direction but is free to rotate in a right hand or CW direction. When the vehicle slows to less than the predetermined speed or when steering wheel 20 is rotated to a rotational orientation of below the predetermined amount, LHUBA 60 "deactuates" by moving unidirectional rollers 64 out of braking contact with SCPDD 40 as shown in FIG. 3A, and steering wheel 20 may again be rotated freely in both directions (CCW and CW) unless and until another steering prevention threshold is reached. Further, when the vehicle is moving at or above a predetermined speed, for instance 10 miles per hour (mph), and SCPDD 40 is sensed at being at or above a right hand rotational orientation of greater than a predetermined amount, for instance 10 degrees CW from a center or neutral steering position, electronic control unit 80 determines a steering prevention threshold has been achieved and sends an actuation signal to RHUBA 70, and RHUBA 70 actuates by moving unidirectional rollers 74 into unidirectional braking contact with SCPDD 40 as shown in FIG. 4B and steering wheel 20 is prevented from rotating further in a right hand or CW direction but is free to rotate in a left hand or CCW direction. When the vehicle slows to less than the predetermined speed or when steering wheel 20 is rotated to a rotational orientation of below the predetermined amount, RHUBA 70 "deactuates" by moving unidirectional rollers 74 out of braking contact with SCPDD 40 as shown in FIG. 4A, and steering wheel 20 may again be rotated freely in both directions (CCW and CW) unless and until another steering prevention threshold is reached.

It is noted that ASRLD 10 is preferably adapted such that the various steering prevention thresholds are of substantially fine increments such that the braking of steering wheel 20 is accomplished in a fashion that approximates a smooth non-stair-stepped method. For example, if a vehicle equipped with ASRLD 10 were to be traveling on a substantially large flat horizontal paved surface at a high rate of speed, such as for instance 100 mph, and steering wheel 20 were to be turned hard to the right (or the left), ASRLD 10 would prevent steering wheel 20 from being turned to the right (or the left) to the point that the vehicle would rollover to the left (or to the right), and would more specifically, allow steering wheel 20 to be turned to the right (or the left) very near to but just less than the threshold of vehicle rollover. Further, in the above described scenario, if the right hand (or left hand) steering load were maintained on steering wheel 20 and the vehicle was to be allowed to decelerate, such as by coasting or by braking, the vehicle would turn to the right (or to the left) at an substantially continuously sharper right hand (or left hand) turn (e.g. a substantially decreasing turn radius) corresponding to the decreased rate of speed until the vehicle slowed to the point that it would be traveling at less than the first or slowest steering prevention threshold (such as less than 10 mph). Once the vehicle slowed to the first or slowest steering prevention threshold, the vehicle would then turn to the right (or to the left) at a constant turn rate which would be the full unrestricted turn rate of the vehicle. Thus by this description, it can be seen that at substantially any speed of the vehicle, the vehicle is allowed to turn at a rate approaching but just less than the vehicle rollover threshold for such given "any" speed. ASRLD 10 is somewhat analogous to "anti-lock braking". With anti-lock braking, braking and vehicle control is maximized (breaking distance minimized) by allowing the brakes to apply a braking force that approaches but is never allowed to exceed the tire-to-ground traction breaking threshold. Analogously, with ASRLD 10, steering and vehicle control is maximized by allowing the vehicle to be steered to a degree that approaches but is never allowed to exceed the vehicle rollover threshold.

It is noted that each vehicle model or alteration thereof may have a different propensity for roll. In the first embodiment, such propensity is predetermined and corresponding combinations of turn degree and vehicle speed are determined for various vehicle rollover thresholds. However, it is also understood that vehicle roll propensity is influenced a plurality of factors. In addition to speed and turn degree, such factors may include for instance vehicle center of gravity, vehicle suspension stiffness, vehicle wheel base width, vehicle loading, vehicle tire pressure, traction between a road and the vehicle tires, road angle/banking, etc. Thus in a second embodiment, the second embodiment is substantially identical to the first embodiment except that in the second embodiment, factors in addition to vehicle speed and turn degree are monitored and rollover thresholds are determined on-the-fly. Further in the second embodiment, in order to prevent vehicle rollover due to continued or increased acceleration post-actuation of ASRLD 10, electronic control unit 80 is adapted such that whenever ASRLD 10 is actuated, electronic control unit 80 sends a signal to an accelerator control device such that a vehicle is prevented from further acceleration during the duration of ASRLD 10 actuation.

It is noted that inasmuch as there may be a belief by some that certain circumstances may exist wherein the likelihood of injury or death may be less if a vehicle is allowed to be steered beyond a vehicle threshold of rollover than if a vehicle is restricted from being steered beyond a vehicle threshold of rollover. To satisfy such potential concerns, in a third embodiment, the third embodiment is substantially identical to the second embodiment except that the third embodiment includes an override mode. In such override mode the steering rotational range of motion is automatically not restricted even if a steering prevention threshold is exceeded if an override logic criterion is satisfied. Such override logic criteria may comprise for instance, the detection of a human in near proximity of the drive path of the vehicle or for instance, the detection of a road surface having less than a predetermined coefficient of friction (e.g. an ice packed road).

Figure 5:
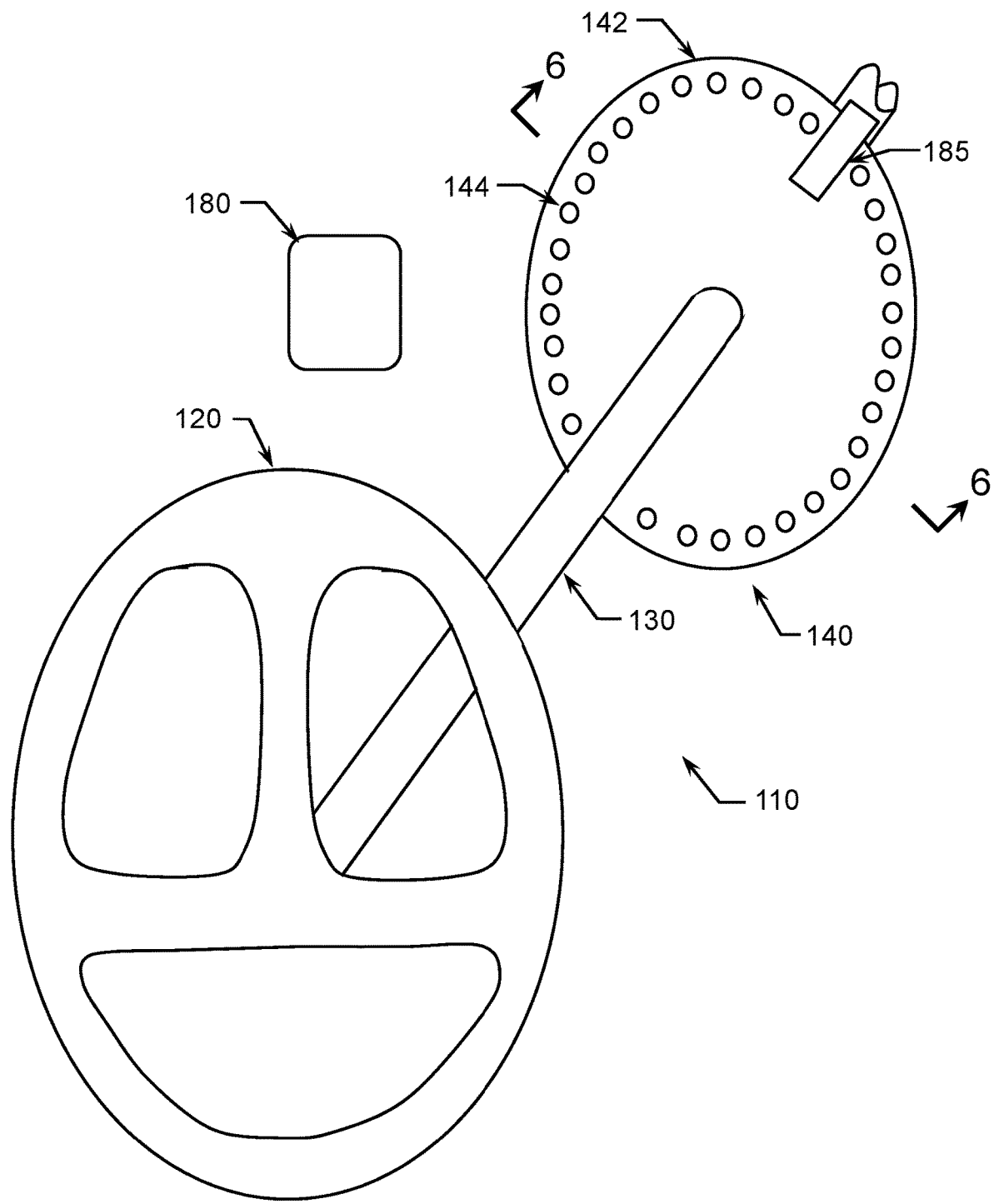
FIG. 5 is a trimetric view of a fourth embodiment of the invention.
Figure 6A:
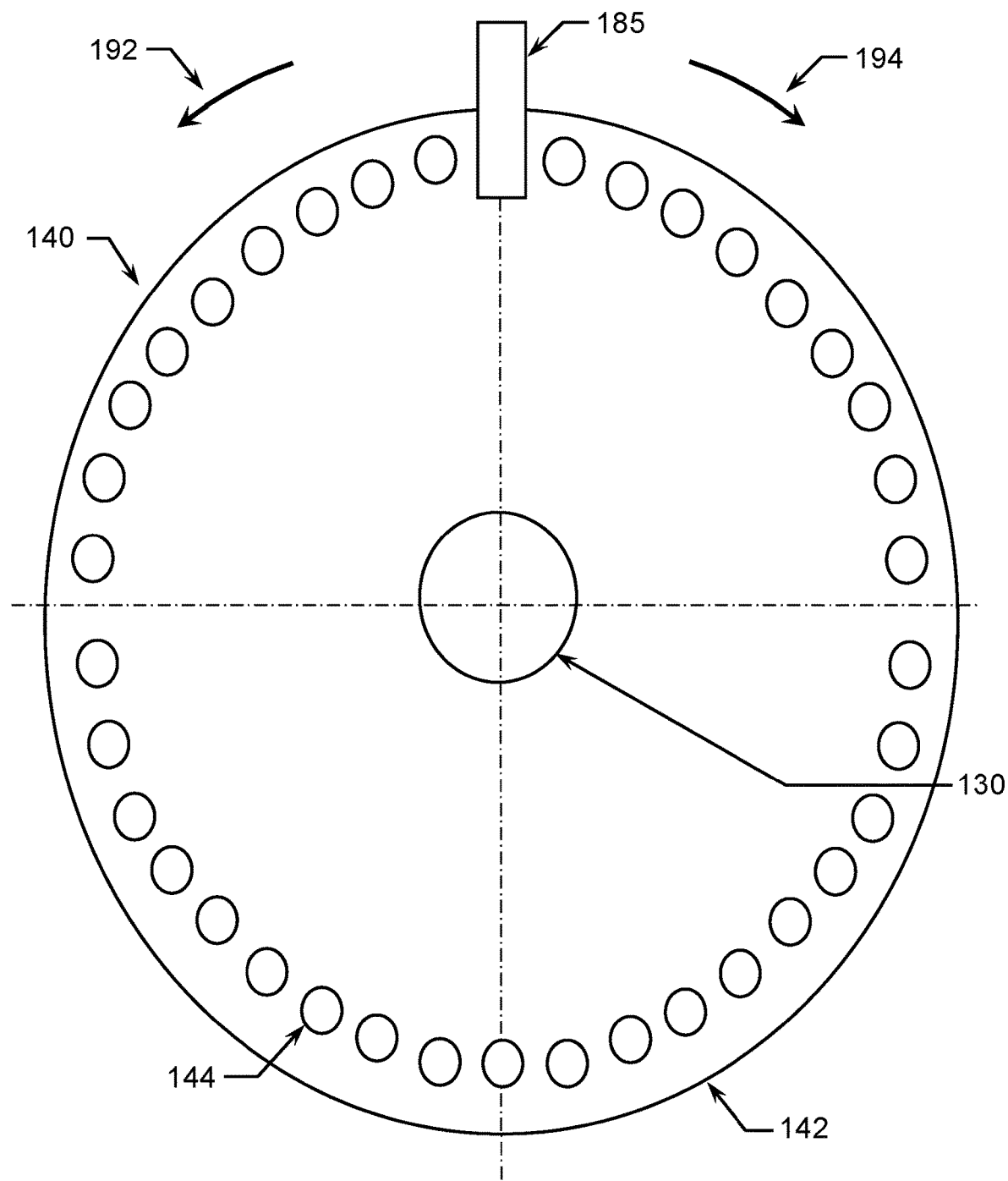
FIG. 6A is an orthographic cross-sectional view of the fourth embodiment of the invention taken substantially at the location indicated by the cross-section arrows annotated with "6" in FIG. 5.
Figure 6B:
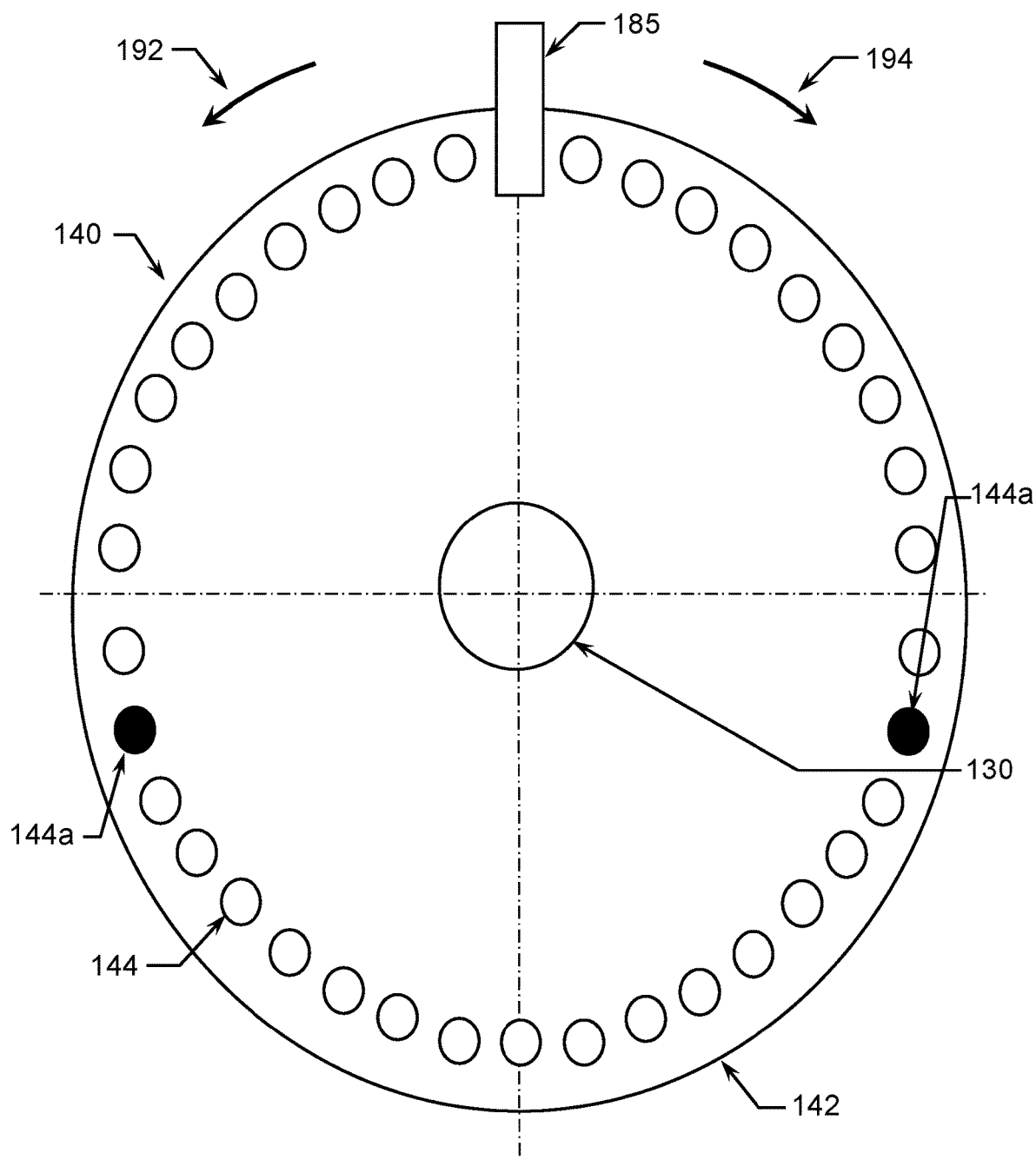
FIG. 6B is substantially similar to FIG. 6A except that a first set of actuator pins are shown as extended.
Figure 6C:
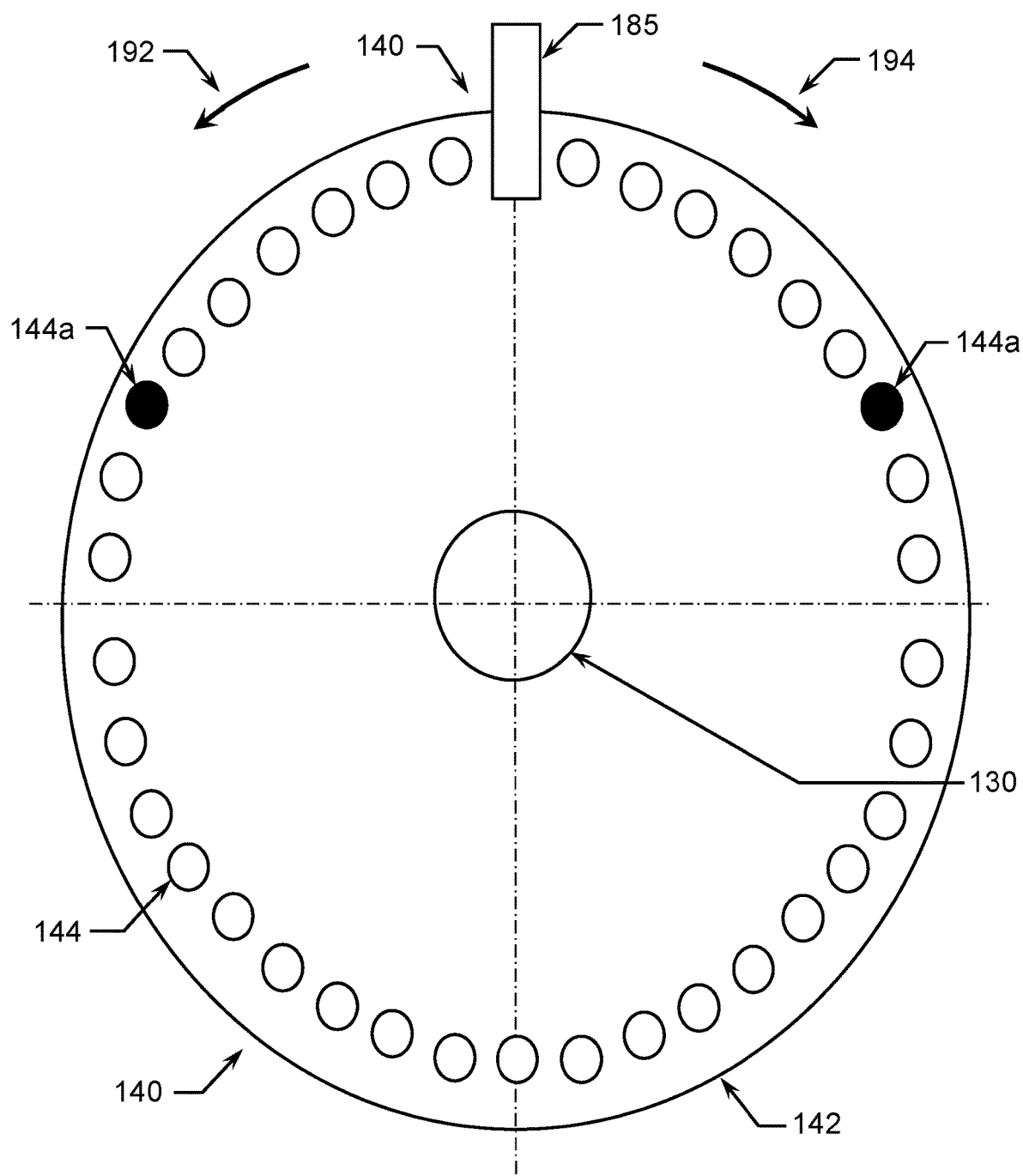
FIG. 6C is substantially similar to FIG. 6A except that a second set of actuator pins are shown as extended.
Figure 6D:
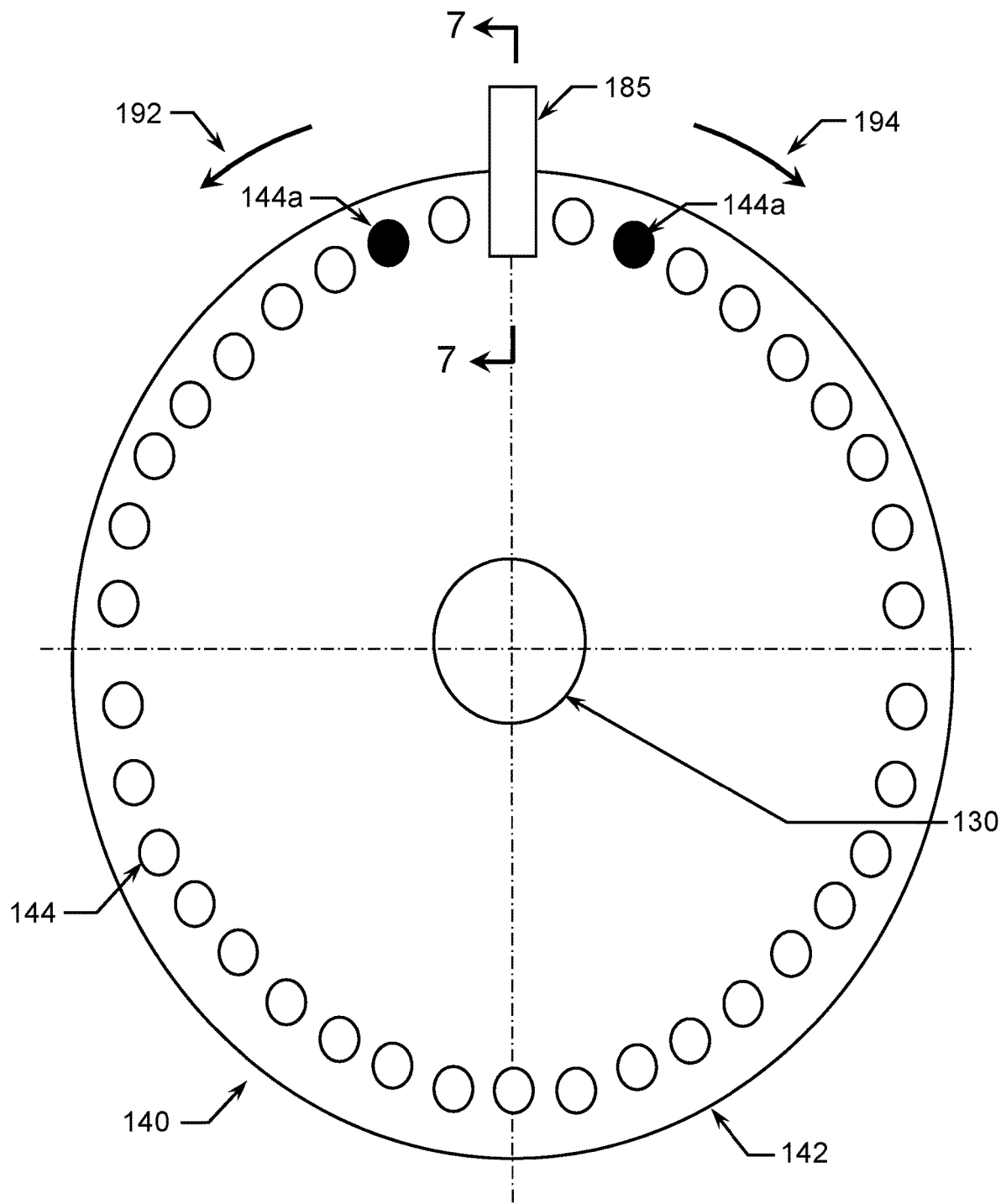
FIG. 6D is substantially similar to FIG. 6A except that a third set of actuator pins are shown as extended.
Figure 6E:
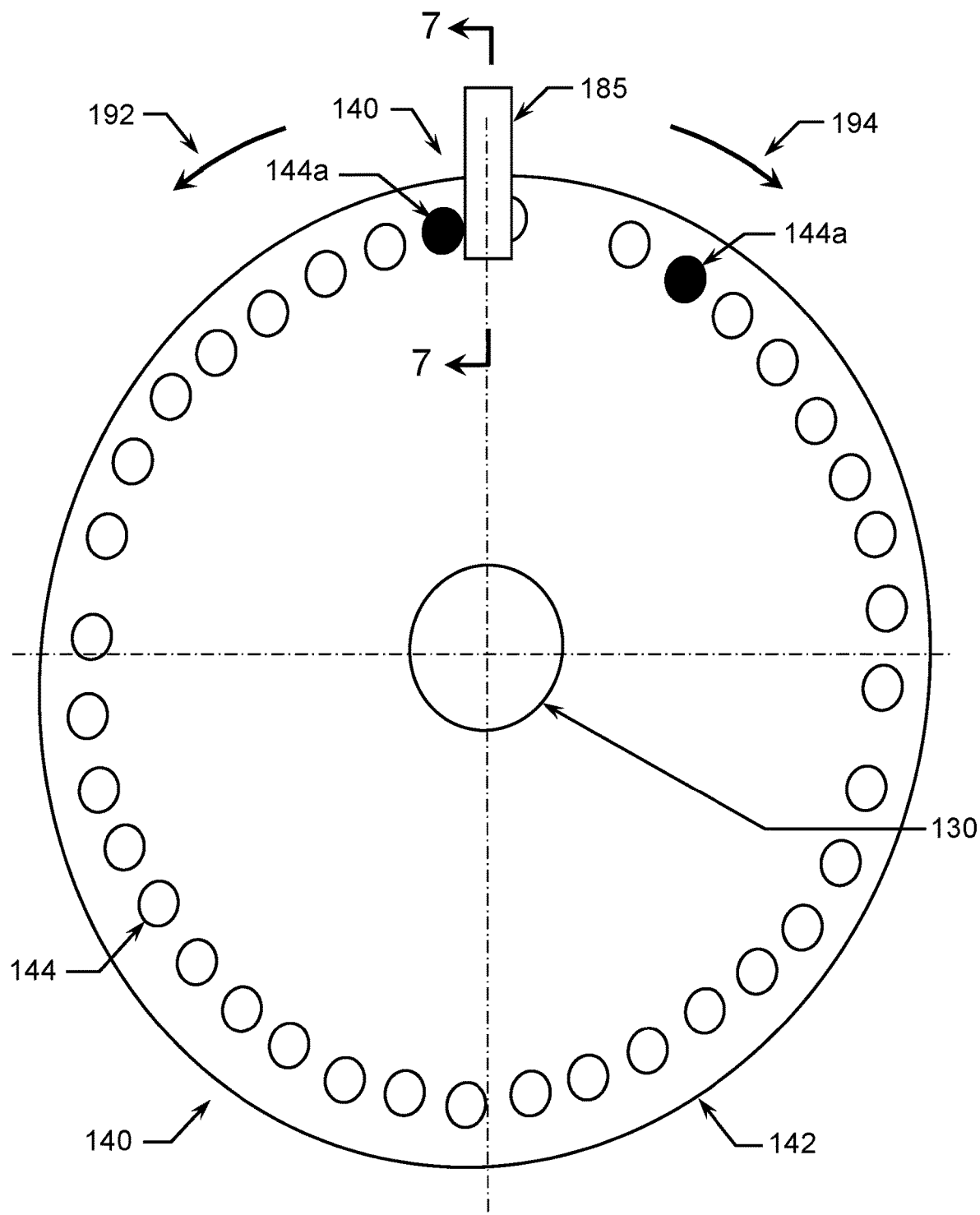
FIG. 6E is substantially similar to FIG. 6D except that SCDD 140 is shown rotated to the limit of its right hand rotational range of motion.
Figure 7:
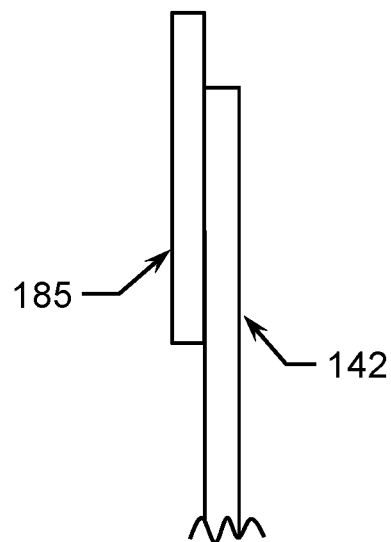
FIG. 7 is an orthographic cross-sectional view of the fourth embodiment of the invention taken substantially at the location indicated by the cross-section arrows annotated with "7" in FIG. 6D, with the invention shown without an actuation pin 144 blocking rotational motion of SCDD 140.
Figure 7A:
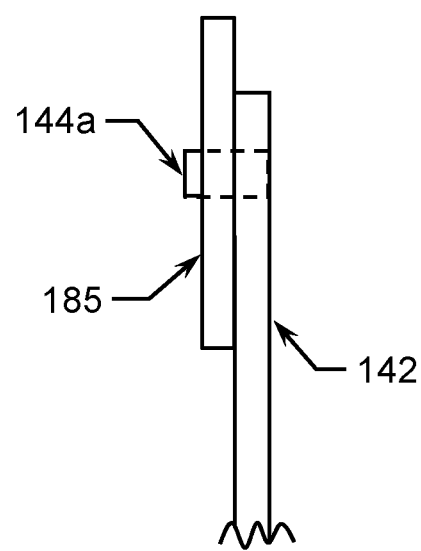
FIG. 7A is an orthographic cross-sectional view of the fourth embodiment of the invention taken substantially at the location indicated by the cross-section arrows annotated with "7" in FIG. 6E, with the invention shown with an actuation pin 144a blocking rotational motion of SCDD 140.

Referring now to FIGS. 5 through 7 of the drawings, a fourth embodiment of the invention is an adaptive steering range limiting device (ASRLD) 110 comprising a steering wheel 120, a steering column 130, a steering column disc device (SCDD) 140, an electronic control unit 180 and a block 185. Furthermore arrow 192 defines a left hand or counterclockwise (CCW) direction indication arrow and arrow 194 defines a right hand or clockwise (CW) direction indication arrow. Steering wheel 120 defines a conventional steering wheel as may commonly be found in a commercially available passenger vehicle. Steering column 130 defines a conventional steering column that serves to transmit steering torque from steering wheel 120 to a rack and pinion or other such vehicle wheel control device. SCDD 140 defines a substantially thin preferably aluminum cylinder shaped disc 142 having a plurality of actuator pins 144 affixed to disc 142 and spaced substantially equally about the periphery of disc 142. Actuator pins 144 are mounted to disc 142 such that in an un-actuated or retracted position, actuator pins 144 are positioned substantially flush with disc 142 and such that in an actuated or extended position, actuator pins 144 are positioned substantially in a position so as to potentially interfere with block 185. Electronic control unit 80 defines an electronic control unit such as are commonly in use in automobiles, and is adapted to electronically receive speed input and is adapted to electronically transmit actuation signals based on predetermined inputs. Block 185 preferably defines rigidly fixed preferably metallic block that is connect to a vehicle structural member and does not move with disc 142.

ASRLD 110 is assembled such that steering column 130 is connected to steering wheel 120 on a first end of steering column 130 and to SCDD 140 on a second end of steering column 130. Electronic control unit 180 is electronically connected to actuator pins 144. ASRLD 110 is mounted in a vehicle such that second end of steering column 130 is steeringly connected to a rack and pinion or like steering mechanism of the vehicle such that ASRLD 110 is operable to steer the vehicle. Block 185 is connected to a structural member of the vehicle such that block 185 remains stationary relative to a rotation movement of SCDD 140 and such that block 185 is able to react or withstand a steering stopping load. Electronic control unit 180 is further connected to a structural member of the vehicle such that electronic control unit 180 remains stationary regardless of rotation movement of SCDD 140.

In practice, with ASRLD 110 operably mounted in a vehicle, when the vehicle is moving below a predetermined speed, for instance less than 5 miles per hour (mph), none of actuator pins 144 are actuated as shown in FIGS. 6A and 6, and steering wheel 120 may be freely rotated through its the full (unrestricted) rotational range of motion. It is noted that when steering wheel 120 is rotated, SCDD 140 correspondingly in very near proximity to stationary block 185. However, when the vehicle is moving at or above a first predetermined speed, for instance 10 miles per hour (mph), electronic control unit 80 determines a first steering prevention threshold has been achieved and sends an actuation signal to a first set of actuator pins 144 as shown in FIG. 6B and steering wheel 120 is prevented from rotating beyond a first restricted range of rotational motion. When the vehicle is moving at or above a second predetermined speed, for instance 35 miles per hour (mph), electronic control unit 80 determines a second steering prevention threshold has been achieved and sends an actuation signal to a second set of actuator pins 144 as shown in FIG. 6C and steering wheel 120 is prevented from rotating beyond a second restricted range of rotational motion. When the vehicle is moving at or above a third predetermined speed, for instance 65 miles per hour (mph), electronic control unit 80 determines a third steering prevention threshold has been achieved and sends an actuation signal to a third set of actuator pins 144 as shown in FIG. 6D and steering wheel 120 is prevented from rotating beyond a third restricted range of rotational motion. When the vehicle slows to less than a given predetermined speed threshold, or when a more restrictive set of actuator pins 144 are actuated or extended, electronic control unit 80 sends an retraction signal to a given set of actuator pins 144, and actuator pins 144 "deactuate" or retract and return to their home position, steering wheel 120 may again be rotated freely in both directions (CCW and CW) unless and until another steering prevention threshold is reached. It is noted that in the fourth embodiment of the invention, in contrast to systems that react to initiation of vehicle rollover. ASRLD 110 functions in a "proactive" mode by preventing the vehicle from initiating a rollover.

It is noted that ASRLD 110 is preferably adapted such that the various steering prevention thresholds are of substantially fine increments such that the varying of steering range of motion of steering wheel 120 is accomplished in a fashion that approximates a smooth non-stair-stepped method. For example, if a vehicle equipped with ASRLD 110 were to be traveling on a substantially large flat horizontal paved surface at a high rate of speed, such as for instance 100 mph, and steering wheel 120 were to be turned hard to the right (or the left), ASRLD 110 would prevent steering wheel 120 from being turned to the right (or the left) to the point that the vehicle would rollover to the left (or to the right), and would more specifically, allow steering wheel 120 to be turned to the right (or the left) very near to but just less than the threshold of vehicle rollover. Further, in the above described scenario, if the right hand (or left hand) steering load were maintained on steering wheel 120 and the vehicle was to be allowed to decelerate, such as by coasting or by braking, the vehicle would turn to the right (or to the left) at an substantially continuously sharper right hand (or left hand) turn (e.g. a substantially decreasing turn radius) corresponding to the decreased rate of speed until the vehicle slowed to the point that it would be traveling at less than the first or slowest steering prevention threshold (such as less than 10 mph). Once the vehicle slowed to the first or slowest steering prevention threshold, the vehicle would then turn to the right (or to the left) at a constant turn rate which would be the full unrestricted turn rate of the vehicle. Thus by this description, it can be seen that at substantially any speed of the vehicle, the vehicle is allowed to turn at a rate approaching but just less than the vehicle rollover threshold for such given "any" speed. ASRLD 110 is somewhat analogous to "anti-lock braking". With anti-lock braking, braking and vehicle control is maximized (breaking distance minimized) by allowing the brakes to apply a braking force that approaches but is never allowed to exceed the tire-to-ground traction breaking threshold. Analogously, with ASRLD 110, steering and vehicle control is maximized by allowing the vehicle to be steered to a degree that approaches but is never allowed to exceed the vehicle rollover threshold.

What is claimed is:

1. An anti-roll steering apparatus having:
    a steering wheel in operative communication with a set of guide wheels of an automobile such that rotation of said steering wheel causes a corresponding change in the angular position of said guide wheels relative to the body of said automobile,
    at least one sensor adapted to sense the magnitude of at least one driving parameter comprising at least one of automobile speed, degree of steering turn, automobile center of gravity, automobile suspension stiffness, automobile wheelbase width, automobile loading, automobile tire pressure, traction between a road and automobile tires, and road bank angle,
    at least one actuator operatively adapted to actuate upon receipt of an actuation signal, and
    an electronic control unit adapted to send an actuation signal to said actuator when a sensed driving parameter exceeds a predetermined magnitude,
    wherein said apparatus has a first mode that allows said automobile to be steered within a maximal non-rollover steering range of motion of said automobile but prevents said automobile from being steered beyond a rollover threshold of said automobile at any rollover capable speed of said automobile regardless of an oversteer rotational load being applied to said steering wheel and regardless of the source of said oversteer rotational load, and
    wherein said apparatus has a second mode that allows said automobile to be steered within a maximal non-rollover steering range of motion of said automobile but does not prevent said automobile from being steered beyond a rollover threshold of said automobile, and
    wherein said apparatus transitions from said first mode to said second mode in response to an application of a non-oversteer-rotational load to said steering wheel, and
    wherein if said guide wheels are turned beyond an angular position point of a rollover threshold of said automobile, said automobile will roll over.

2. The apparatus of claim 1, wherein said automobile comprises a non-autonomously steered automobile, and wherein said source of said oversteer rotational load comprises a human applied oversteer rotational load source.

3. The apparatus of claim 1, wherein said apparatus is automatically actuated in response to the speed of said automobile.

4. The apparatus of claim 1, wherein said actuation signal is sent by said electronic control unit when a combination of sensed automobile speed and degree of steering turn approach a rollover threshold of said automobile.

5. The apparatus of claim 1, wherein said application of a non-oversteer-rotational load to said steering wheel defines an application of load to said steering wheel such that said steering wheel is rotated to a rotational orientation of below a steering prevention threshold.

6. An anti-roll steering apparatus having:
    a steering device in operative communication with at least one guide wheel of a vehicle such that rotation of said a steering device causes a corresponding change in the angular position of said at least one guide wheel relative to the body of said vehicle, at least one sensor adapted to sense the magnitude of at least one driving parameter, at least one actuator operatively adapted to actuate upon receipt of an actuation signal, and an electronic control unit adapted to send an actuation signal to said actuator when a sensed driving parameter exceeds a predetermined magnitude, wherein said apparatus has a first mode that allows said vehicle to be steered within a non-rollover steering range of motion of said vehicle but prevents said vehicle from being steered beyond a rollover threshold of said vehicle at any rollover capable speed of said vehicle regardless of an oversteer load being applied to said a steering device and regardless of the source of said oversteer load, and wherein said apparatus has a second mode that allows said vehicle to be steered within a non-rollover steering range of motion of said vehicle but does not prevent said vehicle from being steered beyond a rollover threshold of said vehicle, and wherein said apparatus transitions from said first mode to said second mode in response to an application of a non-oversteer load to said steering device.

7. The apparatus of claim 6, wherein said vehicle comprises a non-autonomously steered vehicle, and wherein said source of said oversteer load comprises a human applied oversteer load source.

8. The apparatus of claim 6, wherein said apparatus is automatically actuated in response to the speed of said vehicle, and wherein if said at least one guide wheel is turned beyond an angular position point of a rollover threshold of said vehicle, said vehicle will roll over.

9. The apparatus of claim 6, wherein said steering device defines a steering wheel.

10. The apparatus of claim 6, wherein said at least one sensor is adapted to sense the magnitude of at least one driving parameter comprising vehicle speed, degree of steering turn, vehicle center of gravity, vehicle suspension stiffness, vehicle wheelbase width, vehicle loading, vehicle tire pressure, traction between a road and vehicle tires, and road bank angle.

11. The apparatus of claim 6, wherein said actuation signal is sent by said electronic control unit when a combination of sensed vehicle speed and degree of steering turn approach a rollover threshold of said vehicle.

12. The apparatus of claim 6, wherein said application of a non-oversteer load to said steering device defines an application of load to said steering device such that said steering device is adjusted to an orientation of below a steering prevention threshold.

13. The apparatus of claim 6, wherein said input to said steering device defines an application of load to said steering device such that said steering device is adjusted to an orientation of below a steering prevention threshold.

14. An anti-roll steering apparatus having:
a steering device in operative communication with at least one guide wheel of a vehicle,
at least one sensor,
at least one actuator, and
an electronic control unit,
wherein said apparatus has a mode that allows said vehicle to be steered within a non-rollover steering range of motion of said vehicle but prevents said vehicle from being steered to a point of vehicle roll regardless of an oversteer load being applied to said steering device and regardless of the source of said oversteer load, and
wherein said apparatus transitions from said mode in response to an input to said steering device.

15. The apparatus of claim 14, wherein said vehicle comprises a non-autonomously steered vehicle, and wherein said source of said oversteer load comprises a human applied oversteer load source, and wherein said input to said steering device comprises a non-oversteer load applied to said steering device.

16. The apparatus of claim 14, wherein said apparatus is automatically actuated in response to the speed of said vehicle, and wherein if said vehicle is steered beyond a rollover threshold of said vehicle, said vehicle will roll over.

17. The apparatus of claim 14, wherein said steering device defines a steering wheel.

18. The apparatus of claim 14, wherein said at least one sensor is adapted to sense the magnitude of at least one driving parameter comprising vehicle speed, degree of steering turn, vehicle center of gravity, vehicle suspension stiffness, vehicle wheelbase width, vehicle loading, vehicle tire pressure, traction between a road and vehicle tires, and road bank angle.

19. The apparatus of claim 14, wherein said actuation signal is sent by said electronic control unit when a combination of sensed vehicle speed and degree of steering turn approach a rollover threshold of said vehicle.

20. The apparatus of claim 14, wherein said apparatus has a first mode and a second mode, and wherein when said apparatus is in said first mode, said apparatus allows said vehicle to be steered within a non-rollover steering range of motion of said vehicle but prevents said vehicle from being steered beyond a rollover threshold of said vehicle, wherein when said apparatus is in said second mode, said apparatus allows said vehicle to be steered within a non-rollover steering range of motion of said vehicle but does not prevent said vehicle from being steered beyond a rollover threshold of said vehicle, and wherein said apparatus automatically performs at least one of a transition from said first mode to said second mode and a transition from said second mode to said first mode.

* * * * *